US012248323B2

(12) United States Patent
Grossman et al.

(10) Patent No.: US 12,248,323 B2
(45) Date of Patent: *Mar. 11, 2025

(54) SENSOR INTEGRATION FOR LARGE AUTONOMOUS VEHICLES

(71) Applicant: Waymo LLC, Mountain View, CA (US)

(72) Inventors: William Grossman, East Palo Alto, CA (US); Benjamin Pitzer, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,837

(22) Filed: Dec. 18, 2023

(65) Prior Publication Data

US 2024/0184296 A1     Jun. 6, 2024

Related U.S. Application Data

(63) Continuation of application No. 17/724,559, filed on Apr. 20, 2022, now Pat. No. 11,899,466, which is a
(Continued)

(51) Int. Cl.
    *G05D 1/00*    (2024.01)
    *B60R 1/12*    (2006.01)
    (Continued)

(52) U.S. Cl.
    CPC ............. *G05D 1/0231* (2013.01); *B60R 1/12* (2013.01); *G01S 7/4813* (2013.01);
    (Continued)

(58) Field of Classification Search
    None
    See application file for complete search history.

(56) References Cited

U.S. PATENT DOCUMENTS

D250,332 S    11/1978  Aiga
D356,537 S    3/1995   Eisenbraun
(Continued)

FOREIGN PATENT DOCUMENTS

CN    105009175 A    10/2015
CN    106546977 A    3/2017
(Continued)

OTHER PUBLICATIONS

Examination Report for European Patent Application No. 18834222.4, May 19, 2023, 6 Pages.
(Continued)

*Primary Examiner* — Amelia Vorce
(74) *Attorney, Agent, or Firm* — Botos Churchill IP Law LLP

(57) ABSTRACT

The technology relates to autonomous vehicles for transporting cargo and/or people between locations. Distributed sensor arrangements may not be suitable for vehicles such as large trucks, busses or construction vehicles. Side view mirror assemblies are provided that include a sensor suite of different types of sensors, including LIDAR, radar, cameras, etc. Each side assembly is rigidly secured to the vehicle by a mounting element. The sensors within the assembly may be aligned or arranged relative to a common axis or physical point of the housing. This enables self-referenced calibration of all sensors in the housing. Vehicle-level calibration can also be performed between the sensors on the left and right sides of the vehicle. Each side view mirror assembly may include a conduit that provides one or more of power, data and cooling to the sensors in the housing.

18 Claims, 8 Drawing Sheets

Related U.S. Application Data continuation of application No. 16/009,499, filed on Jun. 15, 2018, now abandoned.

(60) Provisional application No. 62/611,685, filed on Dec. 29, 2017.

(51) Int. Cl.

| | | |
|---|---|---|
| G01S 7/481 | (2006.01) | |
| G01S 13/86 | (2006.01) | |
| G01S 17/86 | (2020.01) | |
| G01S 17/87 | (2020.01) | |
| G01S 17/931 | (2020.01) | |
| G05D 1/247 | (2024.01) | |
| G05D 1/249 | (2024.01) | |
| G01S 13/931 | (2020.01) | |

(52) U.S. Cl.
CPC .......... *G01S 13/865* (2013.01); *G01S 13/867* (2013.01); *G01S 17/86* (2020.01); *G01S 17/87* (2013.01); *G01S 17/931* (2020.01); *G05D 1/0257* (2013.01); *G05D 1/247* (2024.01); *G05D 1/249* (2024.01); *B60R 2001/1223* (2013.01); *G01S 2013/93274* (2020.01)

(56) References Cited

U.S. PATENT DOCUMENTS

| | | |
|---|---|---|
| D375,070 S | 10/1996 | Yeabower |
| 6,229,434 B1 | 5/2001 | Knapp et al. |
| 6,361,178 B1 | 3/2002 | Lang et al. |
| 6,592,230 B2 | 7/2003 | Dupay |
| D636,308 S | 4/2011 | Reimchen et al. |
| 8,602,573 B2 | 12/2013 | Brester |
| 9,566,911 B2 | 2/2017 | Greenwood et al. |
| 9,625,582 B2 | 4/2017 | Gruver et al. |
| D815,577 S | 4/2018 | Chiang |
| 2002/0035444 A1 | 3/2002 | Wilkerson et al. |
| 2008/0059015 A1 | 3/2008 | Whittaker et al. |
| 2009/0316285 A1 | 12/2009 | Bigolin |
| 2011/0127328 A1 | 6/2011 | Warren |
| 2012/0242972 A1 | 9/2012 | Wee |
| 2014/0063231 A1 | 3/2014 | Brester |
| 2016/0272163 A1 | 9/2016 | Dreiocker et al. |
| 2016/0282468 A1 | 9/2016 | Gruver et al. |
| 2017/0025019 A1* | 1/2017 | Pink ................... G01S 17/931 |
| 2017/0115387 A1 | 4/2017 | Luders et al. |
| 2017/0158136 A1 | 6/2017 | Garcia Solache |
| 2017/0210297 A1 | 7/2017 | Kim et al. |
| 2018/0032822 A1 | 2/2018 | Frank et al. |
| 2018/0052236 A1 | 2/2018 | Hoffman et al. |
| 2018/0095473 A1 | 4/2018 | Fakhfakh et al. |
| 2018/0164408 A1 | 6/2018 | Hall et al. |
| 2018/0222450 A1 | 8/2018 | Kunze |
| 2018/0267558 A1 | 9/2018 | Tiwari et al. |
| 2018/0290594 A1 | 10/2018 | Abdel-Rahman et al. |
| 2018/0329036 A1 | 11/2018 | Huebner et al. |
| 2018/0350391 A1 | 12/2018 | Moore et al. |
| 2018/0364717 A1 | 12/2018 | Douillard et al. |
| 2018/0372875 A1 | 12/2018 | Juelsgaard et al. |
| 2019/0011538 A1* | 1/2019 | Schwarz ............... G01S 7/4817 |
| 2019/0041859 A1 | 2/2019 | Kim et al. |
| 2019/0072646 A1 | 3/2019 | Zelenýet al. |
| 2019/0106058 A1 | 4/2019 | Salter et al. |
| 2019/0118814 A1 | 4/2019 | Wood et al. |
| 2019/0168569 A1 | 6/2019 | Lee |
| 2019/0170612 A1 | 6/2019 | Clark et al. |
| 2019/0180467 A1 | 6/2019 | Li et al. |
| 2019/0189015 A1 | 6/2019 | Gesch et al. |
| 2020/0043344 A1 | 2/2020 | Shimizu et al. |
| 2020/0064483 A1 | 2/2020 | Li et al. |
| 2020/0073401 A1 | 3/2020 | Szatmary et al. |
| 2020/0145569 A1 | 5/2020 | Wheeler et al. |
| 2021/0110484 A1 | 4/2021 | Shalev-Shwartz et al. |

FOREIGN PATENT DOCUMENTS

| | | |
|---|---|---|
| DE | 102017004842 A1 | 12/2017 |
| EP | 2775316 A2 | 9/2014 |
| EP | 2775316 A3 | 9/2015 |
| WO | 0145067 A1 | 6/2001 |

OTHER PUBLICATIONS

Teslarati.com, "Tesla Semi's vast array of Autopilot cameras and sensors for convoy mode spotted", Nov. 26, 2017, retrieved from: https://www.teslarati.com/tesla-semi-autopilot-cameras-convoy-technology/ on May 6, 2020 (Year: 2017).

The First Office Action for Chinese Patent Application No. 201880084695.2, Feb. 28, 2023.

"International Search Report and Written Opinion for Application No. PCT/US2018/066808 dated Mar. 28, 2019", 14 pages.

"Safety Technologies for Heavy Vehicles and Combinations", Transport for NSW, transport.nsw.gov.au, Cat. No. 45094061, Jun. 2017, 36 pages.

Delphi , "Delphi Integrated Radar and Camera System Racam", retrieved from the Internet <www.delphi.com>, on Nov. 20, 2017, 1 page.

Delphi , "Delphi Rear and Side Detection System", retrieved from the Internet <www.delphi.com>, on Nov. 20, 2017, 1 page.

Krok , "Ford Patent Application Cleverly Hides Lidar in Side Mirrors", retrieved from the Internet <https://www.cnet.corn/roadshow/news/ford-patent-applicaiton-lidar-in- . . . ,> on Nov. 20, 2018, 2 pages.

Nyberg , "Stabilization Sensor Fusion and Path Following for Autonomous Reversing of a Full-scale Truck and Trailer System", Department of Electrical Engineering, Linkoping University, 2016, 50 pages.

\* cited by examiner

100

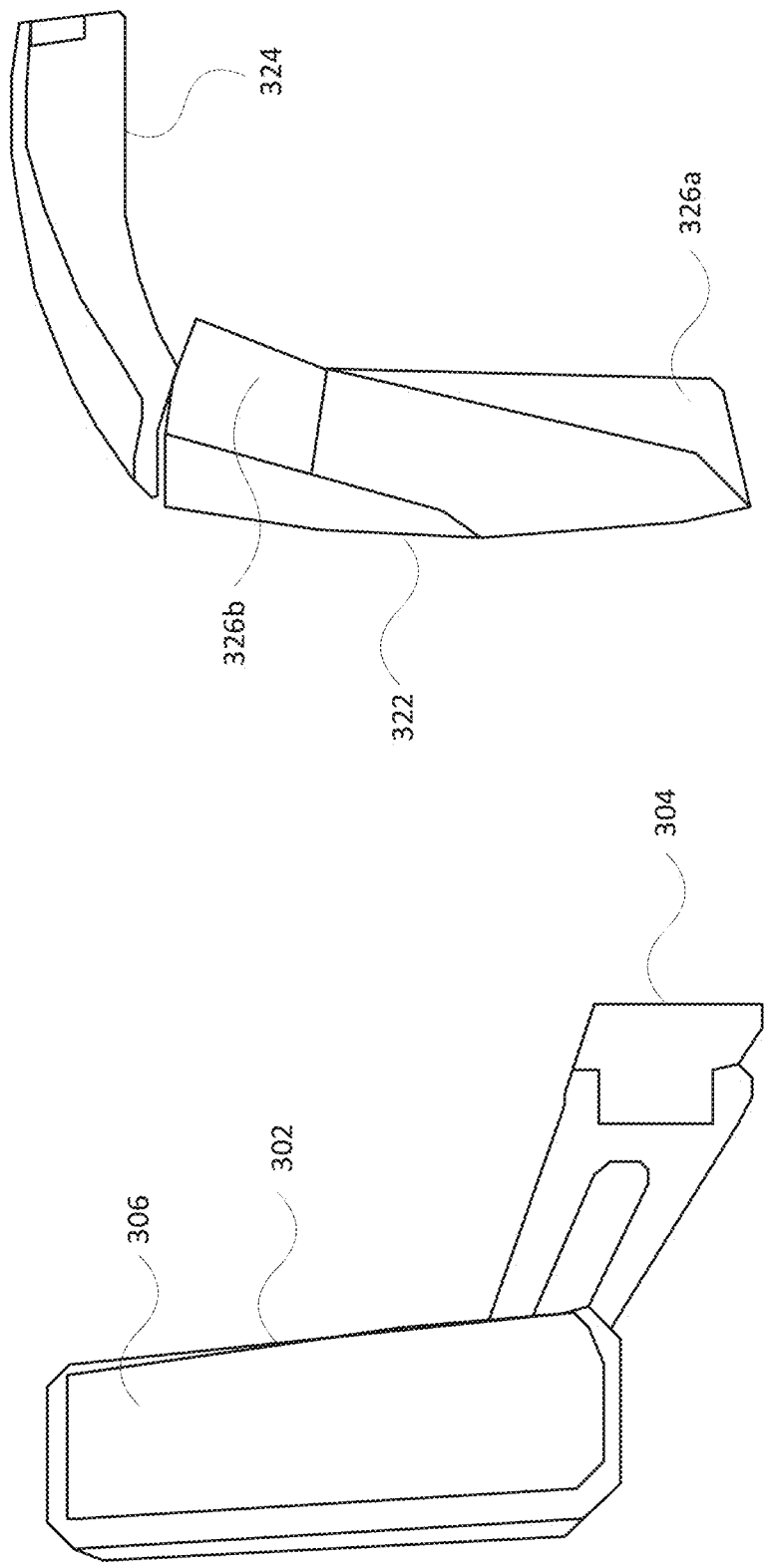

324

322

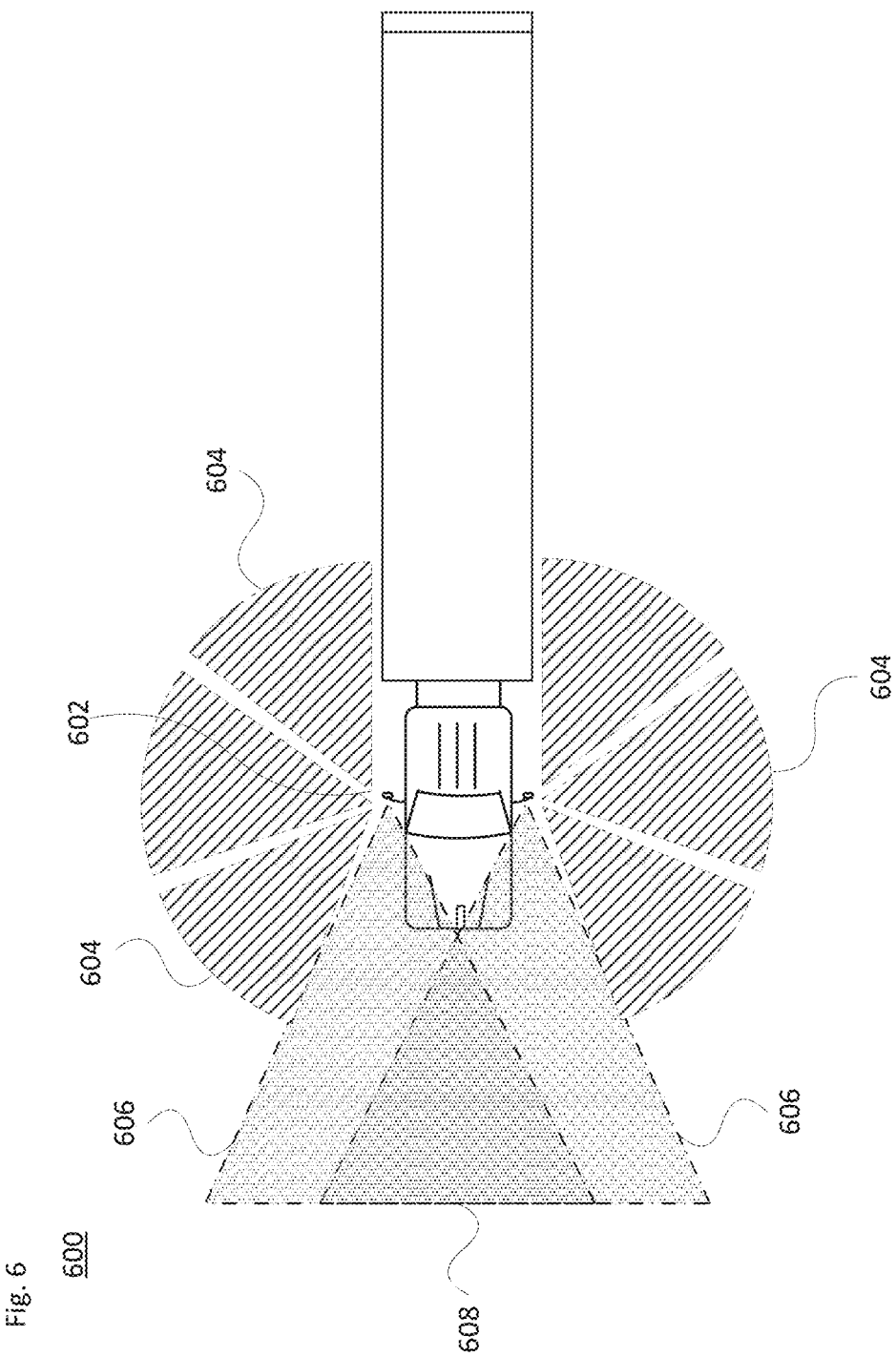

SENSOR INTEGRATION FOR LARGE AUTONOMOUS VEHICLES

CROSS-REFERENCE TO RELATED APPLICATIONS

The present application is a continuation of U.S. patent application Ser. No. 17/724,559, filed Apr. 20, 2022, which is a continuation of U.S. patent application Ser. No. 16/009,499, filed Jun. 15, 2018, which claims the benefit of the filing date of U.S. Provisional Patent Application No. 62/611,685 filed Dec. 29, 2017, the entire disclosures of which are incorporated by reference herein.

BACKGROUND

Autonomous vehicles, such as vehicles that do not require a human driver, can be used to aid in the transport of passengers, cargo or other items from one location to another. Such vehicles may operate in a fully autonomous mode or a partially autonomous mode where a person in the vehicle may provide some driving input. To aid driving in an autonomous mode, one or more sets of sensors are used to detect features and objects in the environment around the vehicle. The sensors may be placed at different locations about the vehicle in order to gather information about the surrounding environment. However, there may be concerns regarding the placement of such sensors and the cost of equipping large vehicles with them.

BRIEF SUMMARY

Aspects of the disclosure provide a sensor tower assembly that is especially beneficial for trucks, busses, construction equipment and other large vehicles. The assembly co-locates various types of sensors in an integrated housing. The integrated housing is rigidly affixed to a side of the large vehicle in a manner that provides enhanced fields of view for the sensors. In one instance, the integrated housing augments or replaces a side view mirror housing. Conduits provide power, control and cooling/heating to the various sensors, and return acquired sensor information from the sensors to a control system of the vehicle so that it may operate in an autonomous or semi-autonomous mode.

According to aspects of the disclosure, a side sensor assembly is provided for use on a truck or bus capable of operating in an autonomous driving mode. The side sensor assembly comprises a housing, a mounting element, a plurality of sensors and a conduit. The housing has one or more exterior surfaces and an interior receptacle. At least one of the one or more exterior surfaces including a side view mirror thereon. The mounting element has a first end and a second end remote from the first end. The first end is coupled to the housing along one or more mounting points. The second end is configured to rigidly secure the housing to the truck or bus. The plurality of sensors is received within the interior receptacle of the housing. The plurality of sensors includes a pair of light detection and ranging (LIDAR) sensors. A first one of the pair of LIDAR sensors is a long range LIDAR having a detection range of at least 50 meters and a second one of the pair of LIDAR sensors is a short range LIDAR having a detection range of no more than 50 meters. The conduit is received within the mounting element. The conduit provides one or more of a power line, a data line and a cooling line to the plurality of sensors received within the housing and is configured for connection to one or more operational systems of the truck or bus.

In one example, the long range LIDAR is arranged along a first end of the interior receptacle and the short range LIDAR is arranged along a second end of the interior receptacle opposite the long range LIDAR. When the mounting element is affixed to the truck or bus, the long range LIDAR is positioned closer to a roof of the truck or bus than the short range LIDAR so that the long range LIDAR has a field of view that extends past a front hood of the truck or bus during operation.

In another example, the plurality of sensors further includes at least one of a radar sensor and a camera sensor disposed between the long range LIDAR and the short range LIDAR within the interior receptacle. Here, the at least one radar sensor may comprise a plurality of radar sensors arranged to provide overlapping fields of view along a side of the truck or bus during operation. The at least one camera sensor may comprise a plurality of cameras arranged to provide overlapping fields of view along a side of the truck or bus during operation. The plurality of sensors may further include at least one inertial sensor disposed between the long range LIDAR and the short range LIDAR within the interior receptacle.

In a further example, the plurality of sensors received within the interior receptacle of the housing are affixed within the housing relative to a common axis or physical reference point of the housing. In this case, the plurality of sensors may be calibrated collectively relative to the common axis or physical reference point.

In yet another example, the side sensor assembly comprises a pair of side sensor assemblies. Each one of the pair has a respective housing, mounting element, plurality of sensors and conduit. A first one of the pair is configured for affixation to a left side of the truck or bus and a second one of the pair is configured for affixation to a right side of the truck or bus.

According to further aspects of the disclosure, a vehicle is configured to operate in an autonomous driving mode. The vehicle comprises a driving system configured to perform driving operations, a perception system configured to detect objects in an environment surrounding the vehicle, and a control system. The control system is operatively coupled to the driving system and the perception system. The control system has one or more computer processors configured to receive data from the perception system and to direct the driving system when operating in the autonomous driving mode. The perception system includes a pair of side sensor assemblies attached to opposite sides of the vehicle. Each side sensor assembly includes a housing, a mounting element, a plurality of sensors and a conduit. The housing has one or more exterior surfaces and an interior receptacle. At least one of the one or more exterior surfaces includes a side view mirror thereon. The mounting element has a first end and a second end remote from the first end. The first end is coupled to the housing along one or more mounting points. The second end is configured to rigidly secure the housing to a corresponding side of the vehicle. The plurality of sensors is received within the interior receptacle of the housing. The plurality of sensors includes a pair of light detection and ranging (LIDAR) sensors. A first one of the pair of LIDAR sensors is a long range LIDAR having a detection range of at least 50 meters and a second one of the pair of LIDAR sensors is a short range LIDAR having a detection range of no more than 50 meters. The conduit is received within the mounting element. The conduit provides one or both of a power line and a data line to the plurality of sensors received within the housing and connects to one or more operational systems of the vehicle.

In one example, the long range LIDAR is arranged along a first end of the interior receptacle and the short range LIDAR is arranged along a second end of the interior receptacle opposite the long range LIDAR. Here, the long range LIDAR is positioned closer to a roof of the vehicle than the short range LIDAR so that the long range LIDAR has a field of view that extends past a front hood of the vehicle during operation.

In another example, the plurality of sensors in each side sensor assembly further includes at least one of a radar sensor and a camera sensor disposed between the long range LIDAR and the short range LIDAR within the interior receptacle. In this case, the plurality of sensors in each side sensor assembly may further include at least one inertial sensor disposed between the long range LIDAR and the short range LIDAR within the interior receptacle. The at least one inertial sensor in each side sensor assembly may provide redundancy to the at least one inertial sensor in the other side sensor assembly.

In a further example, the plurality of sensors received within the interior receptacle of the housing are affixed within the housing relative to a common axis or physical reference point of the housing. Here, the plurality of sensors in each side sensor assembly may be calibrated collectively relative to the common axis or physical reference point of that side sensor assembly.

According to another example, the plurality of sensors in each side sensor assembly is calibrated relative to the other side sensor assembly. In yet another example, the vehicle is one of a truck, a bus, or a construction vehicle. In another example, the autonomous driving mode is a Level 4 or Level 5 autonomous mode of operation. And in a further example, the conduit further provides a cooling line to the plurality of sensors received within the housing.

BRIEF DESCRIPTION OF THE DRAWINGS

FIGS. 3A-B are example sensor assembly configurations in accordance with aspects of the disclosure.

FIG. 6 is an example of radar or camera coverage for a large vehicle in accordance with aspects of the disclosure.

DETAILED DESCRIPTION

Overview

Figure 1A:
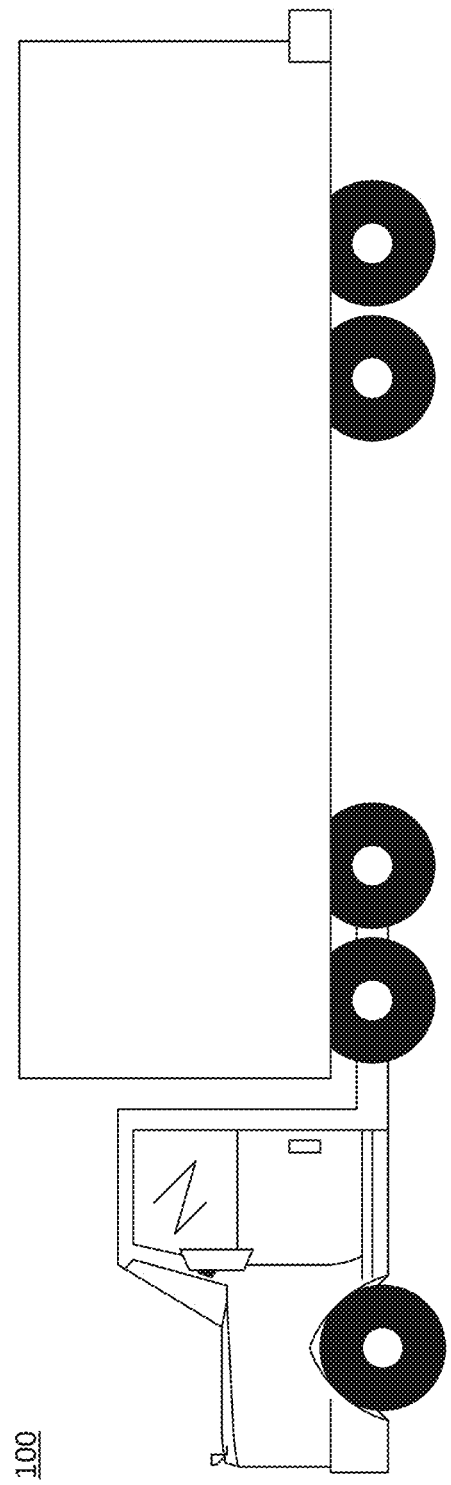
FIGS. 1A-B illustrate an example tractor-trailer for use with sensor towers according to aspects of the disclosure.
Figure 1B:
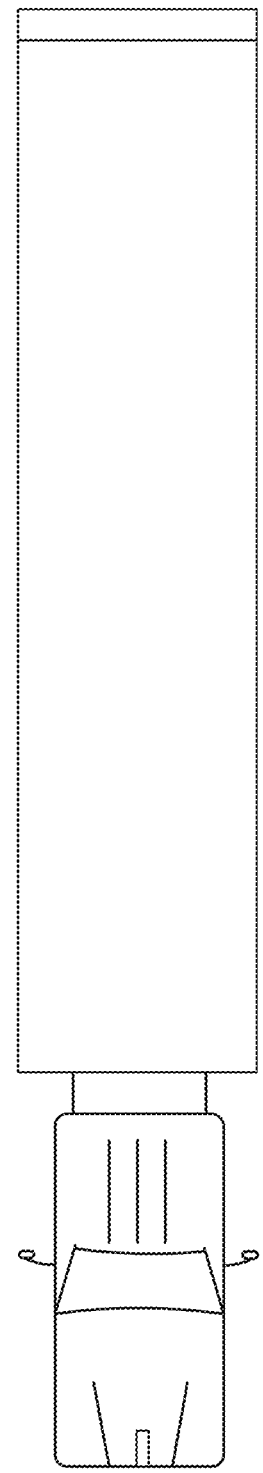
Figure 1C:
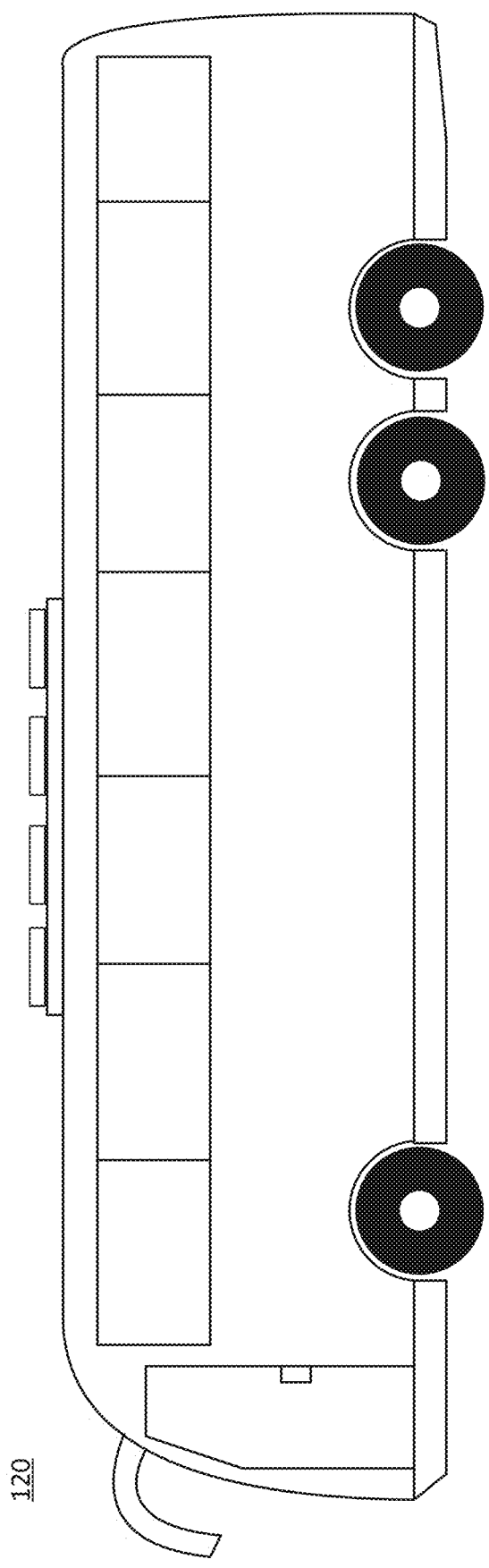
FIGS. 1C-D illustrate an example bus for use with sensor towers according to aspects of the disclosure.
Figure 1D:
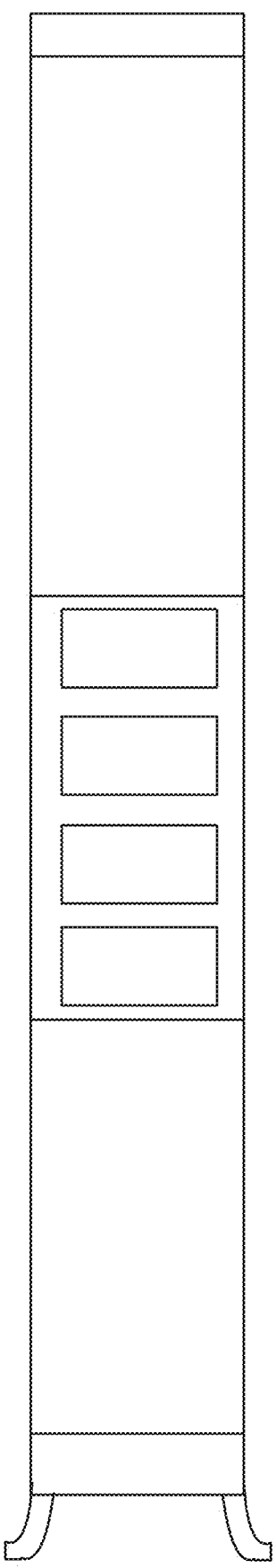

The technology relates to autonomous or semi-autonomous vehicles for transporting cargo and/or people between locations. Large trucks, busses and construction equipment, unlike passenger cars, typically do not provide good 360° visibility from a single vantage point. For instance, FIGS. 1A-B illustrate an example truck 100, and FIGS. 1C-D illustrate an example bus 120. The truck 100 may be, e.g., a single, double or triple tractor-trailer, or other medium or heavy duty truck such as in weight classes 4 through 8. The bus 120 may be, e.g., a school bus, mini bus, trolley, motorcoach, double decker bus, etc. In one example, the large vehicle may be longer than 8-10 meters. In another example, the large vehicle may not exceed the length of a triple tractor trailer. Smaller or larger vehicles can also implement the sensor technologies discussed here.

Such large vehicles may have multiple blind spot areas on the sides and to the rear. Placing sensors on top of the truck cab or trailer, or on the roof of the bus, may not resolve the blind spot issue, and may or may not be feasible. For example, given the heights of such vehicles, it may be impractical to locate sensors on the roof or top due to low clearance bridges, underpasses, tunnels, parking structures, etc. This may limit routes available to the vehicle. It may also be difficult to maintain or service sensors placed on top of large vehicles.

One way to address certain blind spot issues is via side view mirror assemblies. The side view mirror assemblies on large trucks and busses can be placed towards the front of the vehicle. These assemblies can be secured by one or more bracket elements, and project away from the vehicle to the side and/or front, for instance as shown in the top views of FIGS. 1B and 1D. Incorporating various sensor components into the side view mirror assemblies provides the autonomous or semi-autonomous driving system with good fields of view at a height that is beneficial. Specifics of this arrangement are provided in detail below.

There are different degrees of autonomy that may occur in a partially or fully autonomous driving system. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

Example Systems

Figure 2:
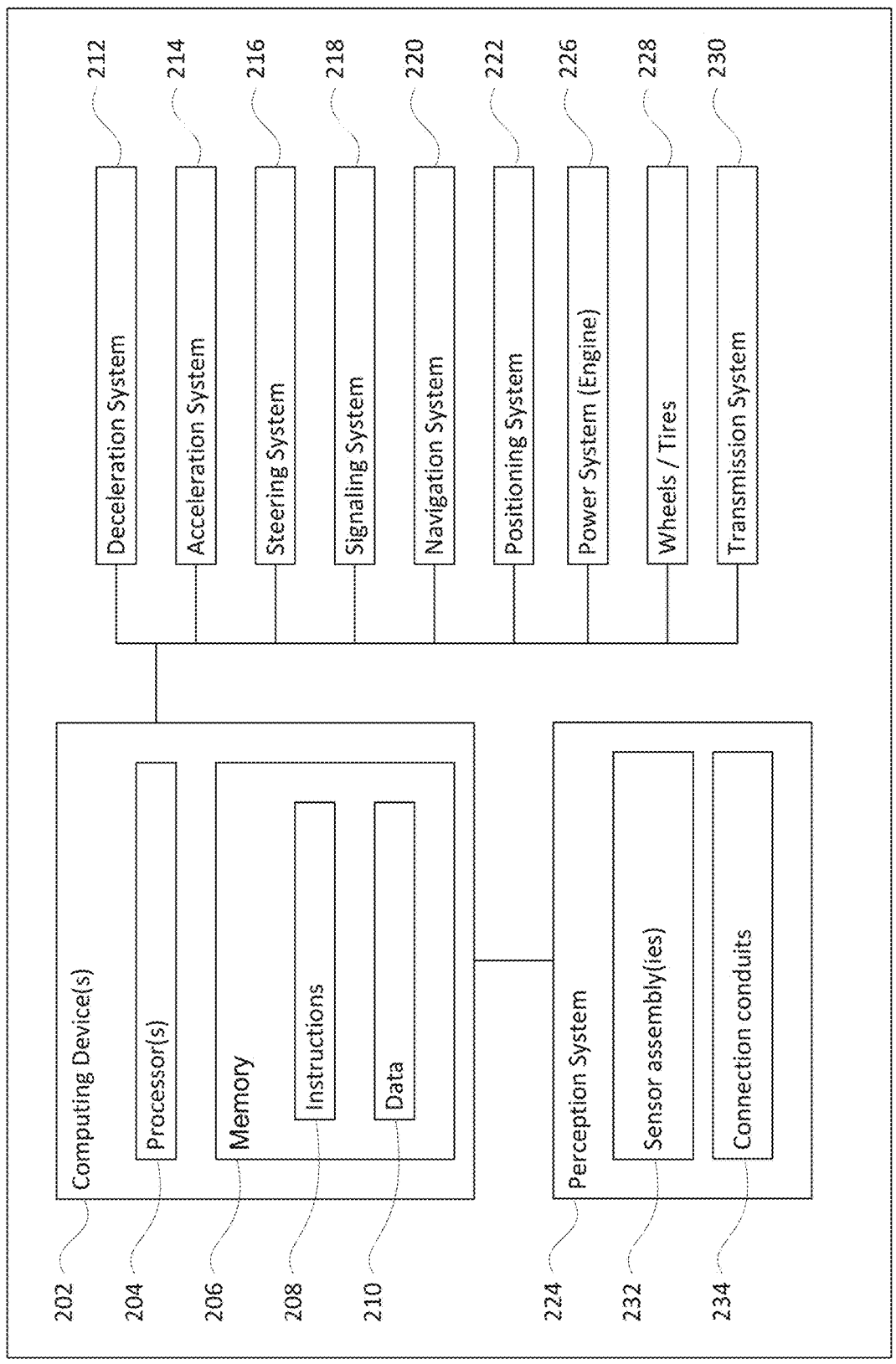
FIG. 2 illustrates a system diagram of autonomous vehicle in accordance with aspects of the disclosure.

FIG. 2 illustrates a block diagram 200 with various components and systems of n vehicle, such as a truck or a bus, capable of operating in a full or semi-autonomous mode of operation. As shown in the block diagram, the vehicle may have a control system of one or more computing devices, such as computing devices 202 containing one or more processors 204, memory 206 and other components typically present in general purpose computing devices.

The memory 206 stores information accessible by the one or more processors 204, including instructions 208 and data 210 that may be executed or otherwise used by the processor 120. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. As an example, data 210 of memory 206 may store information, such as calibration information, to be used when calibrating different types of sensors.

The one or more processor 204 may be any conventional processors, such as commercially available CPUs. Alternatively, the one or more processors may be a dedicated device such as an ASIC or other hardware-based processor. Although FIG. 2 functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100 or 120. The autonomous driving computing system may capable of communicating with various components of the vehicle. For example, returning to FIG. 2, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle). The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of vehicle 100 in accordance with the instructions 208 of memory 206 in an autonomous driving mode which does not require or need continuous or periodic input from a passenger of the vehicle. The wheels/tires 228 are couples to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 or 120 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer or a bus, the steering system 216 may include components to control the angle of wheels to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes one or more components for detecting objects external to the vehicle such as other vehicles, obstacles in the roadway, traffic signals, signs, trees, etc. For example, the perception system 224 may include one or more light detection and ranging (LIDAR) sensors, sonar devices, radar units, cameras, inertial (e.g., gyroscopic) sensors, and/or any other detection devices that record data which may be processed by computing devices 202. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can sent for further processing to the computing devices 202 periodically and continuously as it is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly, or between sensors in different sensor assemblies.

As indicated in FIG. 2, the perception system 224 includes one or more sensor assemblies 232, which may be arranged as sensor towers integrated into the side-view mirrors on the truck, bus or other large vehicle such as construction equipment. A connection conduit 234 provides the necessary power, communication, cooling/heating and other connections between a given sensor housing assembly and the vehicle. For instance, a data communication bus may provide bidirectional communication between the sensors of the sensor housing assembly and the computing devices 202. A power line may be connected directly or indirectly to the power system 226, or to a separate power source such as a battery controlled by the computing devices 202. A cooling line may also couple to the power system 226 or to a dedicated cooling system of the vehicle. The cooling may be active, e.g., using a cooling fluid or forced cool air, or passive. Alternatively, in very cold or wintry environments, heating may be applied instead of cooling.

FIGS. 3A and 3B illustrate two examples of sensor assemblies. For instance, FIG. 3A illustrates a sensor assembly 300 with a housing 302 and a mounting element 304. As shown, a mirror 306 is arranged on an outside surface of the housing 302. FIG. 3B similarly illustrates another sensor assembly 320 with a housing 322 and a mounting element 324. Here, multiple mirrors 326a and 326b may be arranged on different exterior surfaces of the housing 322. Each housing is configured to store the various LIDAR sensors, sonar devices, radar units, cameras, inertial and/or gyroscopic sensors therein. The mounting elements are configured to rigidly secure the housing to the vehicle. For instance, mounting element 304 may couple the housing 302 to the cab of a tractor-trailer vehicle such as vehicle 100. And mounting element 324 may couple the housing 322 to the side of a bus such as bus 120. Each side of the vehicle may have a housing 302 or 322 rigidly mounted thereon.

Figure 4B:
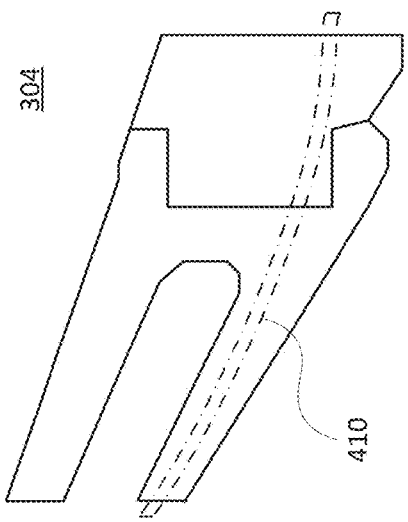
FIGS. 4A-D illustrate arrangements of sensors and conduits with the sensor assembly configurations of FIGS. 3A-B, in accordance with aspects of the disclosure.
Figure 4A:
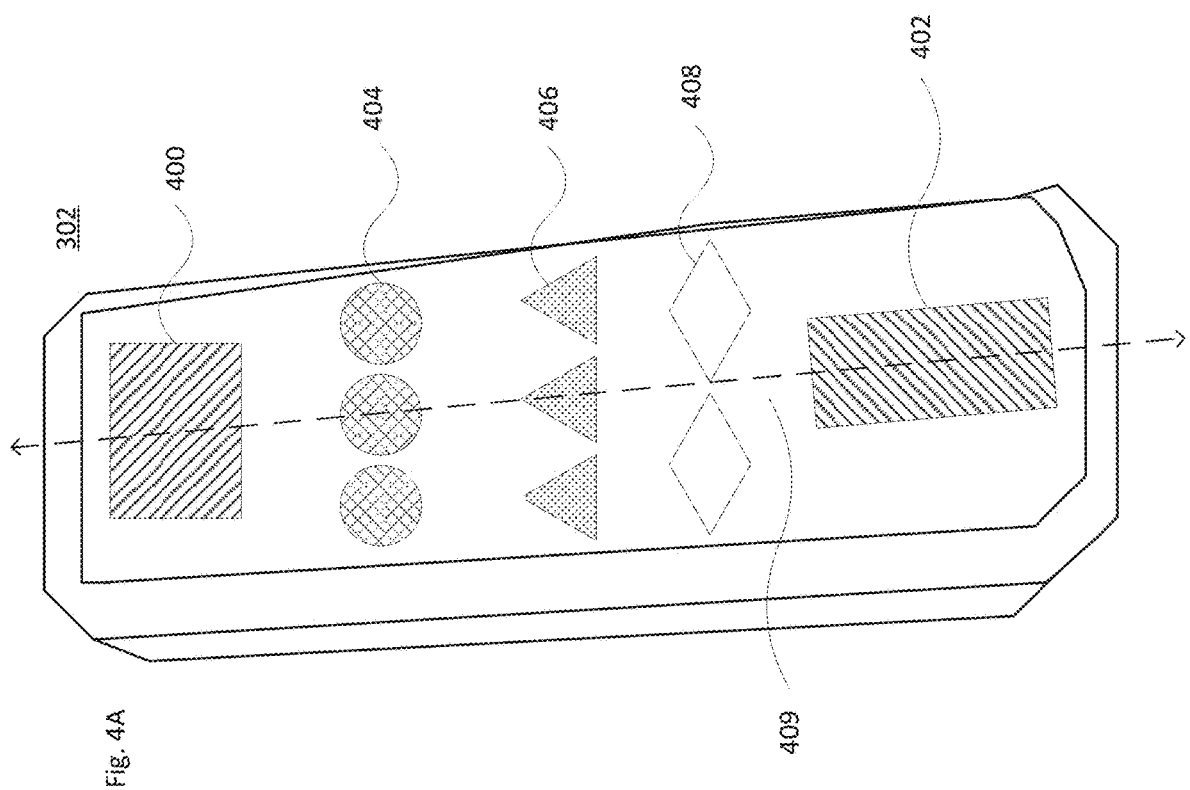

FIG. 4A illustrates an example of the housing 302 with selected sensors illustrated therein. For instance, the sensors may include a long range, narrow field of view (FOV) LIDAR 400 and a short range, tall FOV LIDAR 402. In one example, the long range LIDAR 400 may have a range exceeding 50-250 meters, while the short range LIDAR 402 has a range no greater than 1-50 meters. Alternatively, the short range LIDAR 402 may generally cover up to 10-15 meters from the vehicle while the long range LIDAR 400 may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range LIDARs, or by a medium range LIDAR that may also be included in the housing 302. The medium range LIDAR may be disposed between the long and short range LIDARs, and may be aligned about the same common axis or other fixed point as discussed below.

A set of cameras 404 may be distributed along the housing 302, for instance to provide forward, side and rear-facing imagery. Similarly, a set of radars 406 may be distributed along the housing 302 to provide forward, side and rear-facing data. And the sensors 408 may include an inertial sensor, a gyroscope, an accelerometer and/or other sensors. Each of the sensors may be aligned or arranged relative to a common axis 409 or physical point within the housing 302. Examples of these sensors are also illustrated in FIG. 4C.

Figure 4D:
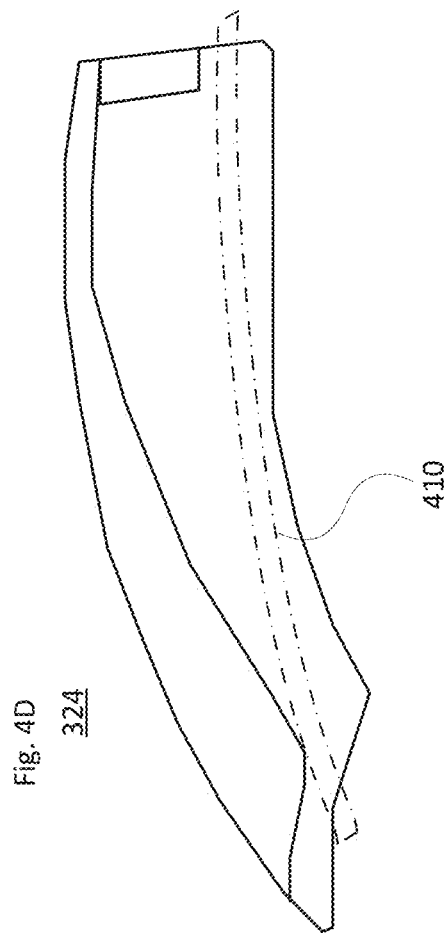
Figure 4C:
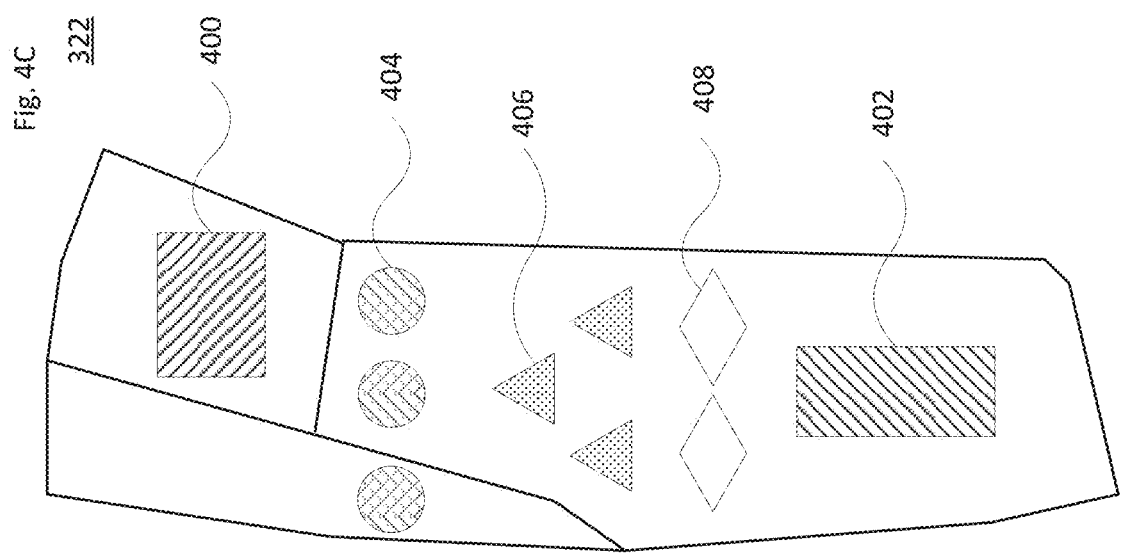

And FIGS. 4B and 4D illustrate a conduit 410 for providing integrated power, data and cooling to the housings. While only one conduit 410 is illustrates, multiple conduits may be provided in each mounting element.

Example Implementations

In addition to the structures and configurations described above and illustrated in the figures, various implementations will now be described.

As noted above, for large trucks, busses, construction equipment and other vehicles, it may be impractical to place sensors on the roof of the vehicle. The roof can be hard to access and has side view limitations. In addition, mounting various sensors on the roof may interfere with aerodynamic roof fairings. While different sensors could be distributed along the front, sides and rear of the vehicle, this may be costly and require running individual data, power and/or cooling lines to each individual sensor. Furthermore, such a solution could be very hard to implement with legacy vehicles, or when the cab of a truck is capable of operating in an autonomous mode but the trailer is a legacy trailer without the necessary sensors.

Thus, according to one aspect, the sensor housing is integrated into a side view mirror assembly, such as shown in FIGS. 3A and 3B. A side mirror assembly is very sturdy, being mounted to the vehicle by a mounting element 304 or 324 that may be cast metal or some other durable material. The sensors, which may weight upwards of 10 kg or more, can be safely secured to the vehicle via the sensor housing. A side view mirror sensor housing could be provided with a new vehicle, or could be easily retrofitted onto an older vehicle chassis.

Assembling the system would include running the conduit from the sensor housing to the truck cab or vehicle chassis. Aggregating the cooling, power and data lines in the conduit, or in separate sub-conduits, and running them to one location on the side of the vehicle significantly simplifies the design, lowers the cost of the components and reduces the time and expense of putting the sensors on the vehicle.

Furthermore, the typical height of the side view mirror for a semi-truck or a bus is on the order of 2 meters or more or less, for instance between 1.5-2.5 meters from the ground. This may be an ideal height for the LIDARs, radars, cameras and other sensors of an integrated sensor tower. And because truck and bus side view mirrors are designed to provide clear lines of sight down the side of the vehicle, the sensors within the housing will enjoy the same visibility. In addition, placing the sensors in the side view mirror assembly protects them from road debris and wheel splash, as the sensors will be at least 1.5-2.5 meters from the ground and away from the wheel wells.

Integrating the sensor housing as part of the side view mirror has the added benefit of avoiding occlusion by a conventional side view mirror. And by conforming to the form factors and placements of side view mirrors, the sensor housing will conform to requirements set forth by the U.S. National Highway Traffic Safety Administration and other governing bodies regarding placement of such elements external to the vehicle. And from a branding standpoint, a common appearance can be provided with a sensor assembly used by various types of large vehicles.

While arranging multiple types of sensors in a side view mirror housing for a large truck or bus may be different than a solution employed for a smaller passenger vehicle, the sensors and algorithms for those sensors that are designed to work with passenger cars can be employed in this new arrangement as well. For instance, the height of the sensors, at around 1.5-2.5 meters, is approximately the height of sensors located on the roof of a sedan or sport utility vehicle.

One advantage of co-locating the sensors in the side view mirror housing is that at from this location there is visibility over the hood of the vehicle and provides more than a 180° FOV for sensors such as LIDARs, radars and cameras. An example of this is shown in FIG. 5, which illustrates coverage 500 for both long range LIDARs and short range LIDARs on both sides of a tractor-trailer.

The long range LIDARs may be located along a top or upper area of the sensor housings 502. For instance, this portion of the housing 502 may be located closest to the top of the truck cab or roof of the vehicle. This placement allows the long range LIDAR to see over the hood of the vehicle. And the short range LIDARs may be located along a bottom area of the sensor housing 502 opposite the long range LIDARs. This allows the short range LIDARs to cover areas immediately adjacent to the cab of the truck or the front portion of a bus. This would allow the perception system to determine whether an object such as another vehicle, pedestrian, bicyclist, etc. is next to the front of the vehicle and take that information into account when determining how to drive or turn. Both types of LIDARs may be co-located in the housing, aligned along a common axis.

Figure 5:
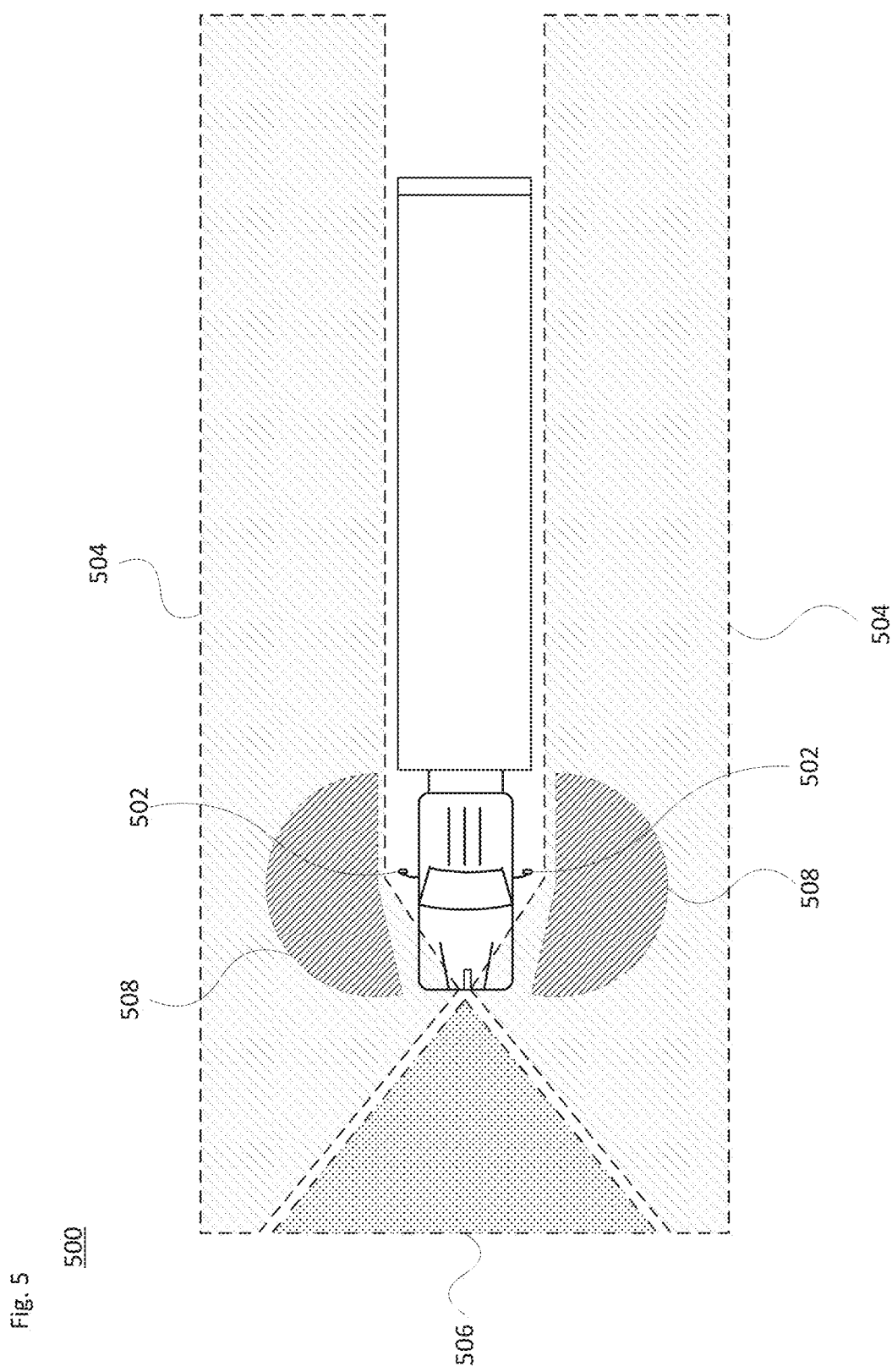
FIG. 5 is an example of short and long range LIDAR coverage for a large vehicle in accordance with aspects of the disclosure.

As illustrated in FIG. 5, the long range LIDARs on the left and right sides of the vehicle have fields of view 504. These encompass significant areas along the sides and front of the vehicle. As shown, there is an overlap region 506 of their fields of view in front of the vehicle. A space is shown between regions 504 and 506 for clarity; however in actuality there is no break in the coverage. The short range LIDARs on the left and right sides have smaller fields of view 508. The overlap region 506 provides the perception system with additional or information about a very important region that is directly in front of the vehicle. This redundancy also has a safety aspect. Should one of the long range LIDAR sensors suffer degradation in performance, the redundancy would still allow for operation in an autonomous mode.

FIG. 6 illustrates coverage 600 for either (or both) of radar and camera sensors on both sides of a tractor-trailer. Here, there may be multiple radar and/or camera sensors in the sensor housing 602. As shown, there may be sensors with side and rear fields of view 604 and sensors with forward facing fields of view 606. The sensors may be arranged so that the side and rear fields of view 604 overlap, and the side fields of view may overlap with the forward facing fields of view 606. As with the long range LIDARs discussed above, the forward facing fields of view 606 also have an overlap region 608. This overlap region provides similar redundancy to the overlap region 506, and has the same benefits should one sensor suffer degradation in performance.

In addition to the cost benefits and reduction in installation time, another benefit to co-locating the LIDAR, radar, camera and/or other sensors in a side view mirror housing involves calibration. Placing these sensors in the same housing means that they are all subject to the same relative movement, as they may be affixed within the housing relative to a common axis or reference point of the housing. This reduces the complexity involved in calibrating each sensor individually and with respect to the other co-located sensors. Calibration of all sensors in one of the side view mirror housings can be done for the whole assembly so that everything is referenced to itself. This is easily accomplished because all sensors in the housing can be rigidly mounted with respect to each other.

Furthermore, vehicle level calibration between left and right side sensor housings can be accomplished by matching features (e.g., convolution) in front of the vehicle, or other overlapping data points. Knowing where the features are with respect to the vehicle also gives the system extrinsic calibrations. And for sensor subsystems, such an inertial sensor subsystem that may employ redundant sensor packages, the different sensor packages may be mounted in each of the side view mirror housings. This has the added benefit of providing high resolution orientation information for all of the co-located sensors.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A vehicle configured to operate in an autonomous driving mode, the vehicle comprising:
   a pair of side sensor assemblies attached to opposite sides of the vehicle, each side sensor assembly including:
      an exterior housing;
      a mounting element configured to rigidly secure the exterior housing to a corresponding side of the vehicle;
      a short range light detection and ranging (lidar) sensor aligned along a common axis of the exterior housing, the short range lidar sensor configured to provide a first field of view (i) having a first detection range along the corresponding side of the vehicle and (ii) encompassing a selected area adjacent to the vehicle;
      a long range lidar sensor aligned along the common axis, the long range lidar sensor configured to provide a second field of view (i) having a second detection range along the corresponding side of the vehicle of at least 50 meters and (ii) encompassing the selected area, the short range lidar sensor and the long range lidar sensor further configured to provide redundancy of coverage for the selected area; and
   a control system having one or more computer processors configured to receive data from the pair of side sensor assemblies and to direct operation of the vehicle, when operating in the autonomous driving mode, based on the received data.

2. The vehicle of claim 1, wherein the selected area is adjacent to the corresponding side of the vehicle.

3. The vehicle of claim 1, wherein the selected area is adjacent to a front of the vehicle.

4. The vehicle of claim 1, wherein the first detection range is no more than 20 meters.

5. The vehicle of claim 1, wherein each side sensor further comprises:
   a first camera disposed adjacent to the long range lidar sensor and configured to obtain imagery towards a front of the vehicle; and a second camera disposed adjacent to the long range lidar sensor and configured to obtain imagery along the corresponding side of the vehicle.

6. The vehicle of claim 5, further wherein each side sensor further comprises a third camera configured to obtain imagery towards a rear of the vehicle.

7. The vehicle of claim 1, wherein each side sensor further comprises a radar sensor.

8. The vehicle of claim 7, wherein the radar sensor is disposed within the exterior housing between the long range lidar sensor and short range lidar sensor.

9. The vehicle of claim 7, wherein the radar sensor comprises:
  a first radar sensor configured to obtain radar returns along a front of the vehicle;
  a second radar sensor configured to obtain radar returns along the corresponding side of the vehicle; and
  a third radar sensor configured to obtain radar returns along a rear of the vehicle.

10. The vehicle of claim 1, wherein:
  the vehicle is a tractor-trailer vehicle including a cab and at least one trailer;
  the exterior housing of a first side sensor assembly of the pair of side sensor assemblies is rigidly secured to a left side of the cab; and
  the exterior housing of a second side sensor assembly of the pair of side sensor assemblies is rigidly secured to a right side of the cab.

11. The vehicle of claim 1, wherein the long range lidar sensor disposed in a first one of the pair of side sensor assemblies is configured to provide redundancy for the long range lidar sensor disposed in a second one of the pair of side sensor assemblies along a region external to the vehicle within a selected field of view.

12. The vehicle of claim 1, further comprising a first conduit at least partly received within the exterior housing, the first conduit providing one or more of a power line or a data line to the long range lidar sensor and the short range lidar sensor and configured for connection to one or more of operational systems of the vehicle.

13. The vehicle of claim 12, further comprising a second conduit at least partly received within the exterior housing, the second conduit providing at least one of a cooling line configured to provide cooling to at least one of the long range lidar sensor or the short range lidar sensor, or a heating line configured to provide heating to at least one of the long range lidar sensor or the short range lidar sensor, the second conduit configured for connection to one or more of the operational systems of the vehicle.

14. A side sensor assembly for use on a truck or bus capable of operating in an autonomous driving mode, the side sensor assembly comprising:
  an exterior housing;
  a mounting element configured to rigidly secure the exterior housing to a corresponding side of the truck or bus;
  a long range light detection and ranging (lidar) sensor aligned along a common axis of the exterior housing, the long range lidar sensor configured to provide a first detection range of at least 50 meters; and
  a short range lidar sensor aligned along the common axis of the exterior housing, the short range lidar sensor configured to provide a second detection range, wherein the long range lidar sensor and the short range lidar sensor are configured to provide complementary information corresponding to a selected area adjacent to the truck or bus.

15. The side sensor assembly of claim 14, wherein each side sensor further comprises:
  a first camera disposed adjacent to the long range lidar sensor and configured to obtain imagery along a front of the truck or bus; and
  a second camera disposed adjacent to the long range lidar sensor and configured to obtain imagery along a side of the truck or bus.

16. The side sensor assembly of claim 15, wherein each side sensor further comprises a radar sensor disposed within the exterior housing between the long range lidar sensor and short range lidar sensor.

17. The side sensor assembly of claim 15, wherein the long range lidar sensor is configured to provide redundancy for another long range lidar sensor disposed in another side sensor assembly of the truck or bus, along a region external to the truck or bus within a selected field of view.

18. The side sensor assembly of claim 15, further comprising a conduit at least partly received within the exterior housing, the conduit providing one or more of a power line or a data line to the long range lidar sensor and the short range lidar sensor and configured for connection to one or more of operational systems of the truck or bus.

* * * * *